E. REYNOLDS.
Gate.
No. 69,024.  Patented Sept. 17, 1867.
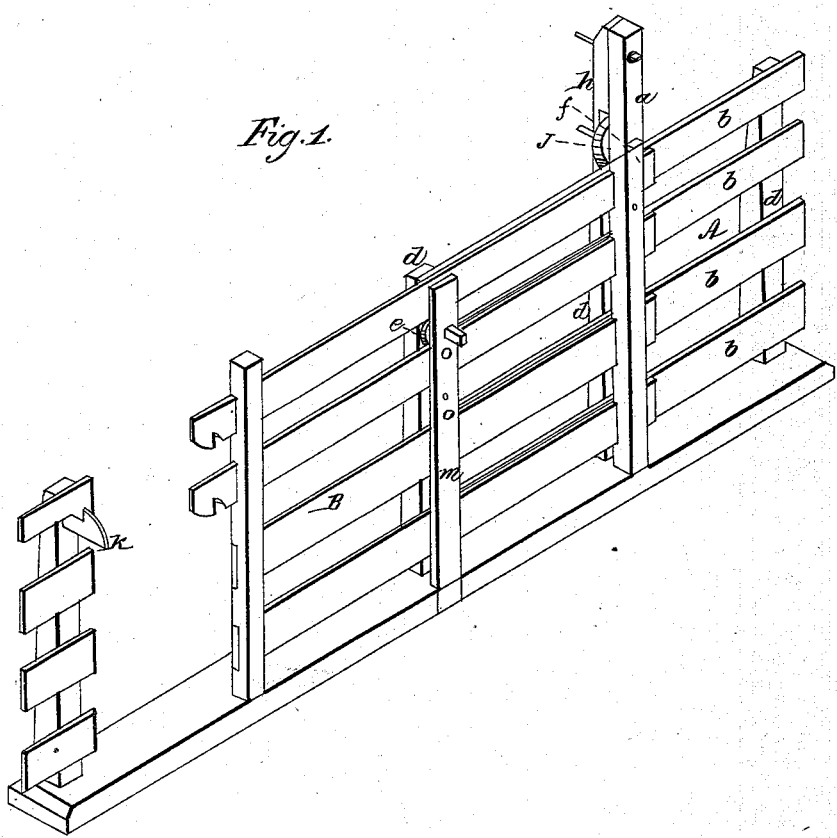

United States Patent Office.

EDWIN REYNOLDS, OF METOMEN, WISCONSIN.

Letters Patent No. 69,024, dated September 17, 1867.

---

IMPROVEMENT IN GATES.

---

The Schedule referred to in these Letters Patent and making part of the same.

---

TO ALL WHOM IT MAY CONCERN:

Be it known that I, EDWIN REYNOLDS, of Metomen, Fond du Lac county, and State of Wisconsin, have invented certain new and useful Improvements in Farm-Gates; and I do hereby declare that the following is a full, true, and exact description of the same, reference being had to the annexed drawings, and to the letters of reference marked thereon, in which—

Figure 1 is a perspective.

A represents one panel of the fence, which is composed of horizontal slats $b\ b$ and posts $d\ d$. $e$ represents a roller, upon which the gate B rests. Said gate is provided with the elongated vertical bar or upright $a$. $g$ is also a roller, which rolls upon the top slat of fence A. This roller is retained in its proper place by means of the movable pin $f$, which confines it between the adjustable piece $h$ and the elongated upright $a$. The two top slats of the gate B should be provided with notches, as shown in the drawings, and for this purpose they are extended a little beyond the other slats. $k$ is a latch, which catches in the notch when the gate is closed. $m$ is an adjustable bar, which serves to bind the gate to the fence. This bar is made adjustable by means of pins $o\ o$. The upper one of said pins acts also as an axle to pulley or roller $e$.

In order that the gates may be elevated so as to slide above the snow, or to allow a free passage of small animals, the bars $m$ and $a$ should be provided with holes, so that by simply changing the position of the rollers to a lower slat you accomplish this desirable feature.

Having thus fully described my invention, what I claim, and desire to secure by Letters Patent, is—

The combination of fence-panel A with gate B, when the same are provided with an elongated bar or upright $a$, adjustable pieces $h\ m$, and pulleys $e\ g$, all constructed, arranged, and operated in the manner and for the purpose set forth and described.

In testimony that I claim the foregoing as my own, I hereby affix my signature in the presence of two witnesses.

EDWIN REYNOLDS.

Witnesses:
 NORMAN MASON,
 THOS. HARRIS.